(12) United States Patent
Lazzarin (10) Patent No.: US 9,079,643 B2
(45) Date of Patent: Jul. 14, 2015

(54) UNDERSEA PIPE-LAYING

(75) Inventor: Diego Lazzarin, Treviso (IT)

(73) Assignee: SAIPEM S.P.A., Milan (IT)

( * ) Notice: Subject to any disclaimer, the term of this patent is extended or adjusted under 35 U.S.C. 154(b) by 42 days.

(21) Appl. No.: 13/521,941

(22) PCT Filed: Jan. 12, 2011

(86) PCT No.: PCT/EP2011/050353
§ 371 (c)(1),
(2), (4) Date: Dec. 28, 2012

(87) PCT Pub. No.: WO2011/086101
PCT Pub. Date: Jul. 21, 2011

(65) Prior Publication Data
US 2013/0115008 A1     May 9, 2013

(30) Foreign Application Priority Data
Jan. 13, 2010 (GB) .................................. 1000556.9

(51) Int. Cl.
*F16L 1/12* (2006.01)
*B63B 35/03* (2006.01)
(Continued)

(52) U.S. Cl.
CPC ................ *B63B 35/03* (2013.01); *F16L 1/225* (2013.01); *F16L 1/235* (2013.01)

(58) Field of Classification Search
CPC .............. B63B 35/03; F16L 1/12; F16L 1/18; F16L 1/235
USPC ........................... 405/158, 166, 167, 169, 170
See application file for complete search history.

(56) References Cited

U.S. PATENT DOCUMENTS 3,438,213 A    4/1969   Broussard et al.
3,641,779 A *   2/1972   Koop et al. .................... 405/167
(Continued)

FOREIGN PATENT DOCUMENTS

GB         2020391 A    11/1979
GB         2 296 956 A    7/1996
(Continued)

OTHER PUBLICATIONS

International Search Report (PCT/ISA/210) issued on Sep. 5, 2011, by the European Patent Office as the International Searching Authority for International Application No. PCT/EP2011/050353.
(Continued)

*Primary Examiner* — Doug Hutton, Jr.
*Assistant Examiner* — Patrick Lambe
(74) *Attorney, Agent, or Firm* — Buchanan Ingersoll & Rooney PC (57) ABSTRACT

A vessel for laying a pipeline includes a plurality of ramps in the region of the first end of the vessel. The plurality of ramps includes a first ramp which is disposed along the pipelaying path, whose inclination is adjustable and which has a first upstream end and a second downstream end, and a second ramp which is disposed along the pipelaying path downstream of the first ramp, whose inclination is adjustable and which has a first upstream end and a second downstream end. The downstream end of the first ramp is positioned inboard of the first end of the vessel and above the bottom of the vessel and the upstream end of the second ramp is positioned inboard of the first end of the vessel and above the bottom of the vessel.

13 Claims, 6 Drawing Sheets (51) Int. Cl.
*F16L 1/225* (2006.01)
*F16L 1/235* (2006.01)

(56) References Cited

U.S. PATENT DOCUMENTS

| | | | |
|---|---|---|---|
| RE27,420 E | | 7/1972 | Rochelle et al. |
| 3,685,305 A | | 8/1972 | Lloyd, III |
| 3,720,069 A | | 3/1973 | Lockridge |
| 3,822,559 A | | 7/1974 | Matthews et al. |
| 3,860,122 A | | 1/1975 | Cernosek |
| 4,230,420 A | | 10/1980 | Chow |
| 4,257,718 A | | 3/1981 | Rosa et al. |
| 4,345,855 A | | 8/1982 | Uyeda et al. |
| 5,413,434 A | * | 5/1995 | Stenfert et al. ......... 405/166 |
| 5,823,712 A | | 10/1998 | Kalkman et al. |
| 5,975,802 A | * | 11/1999 | Willis ................. 405/166 |
| 6,056,478 A | | 5/2000 | Martin et al. |
| 6,213,686 B1 | | 4/2001 | Baugh |
| 6,796,742 B1 | | 9/2004 | Roger et al. |
| 2009/0324339 A1 | * | 12/2009 | Roodenburg et al. ...... 405/166 |

FOREIGN PATENT DOCUMENTS

| | | | |
|---|---|---|---|
| GB | | 2460671 A | 12/2009 |
| WO | | WO 93/06401 A1 | 4/1993 |
| WO | | WO 2006/085739 A1 | 8/2006 |
| WO | | WO 2007/091884 A1 | 8/2007 |
| WO | | WO 2007/094655 A1 | 8/2007 |
| WO | | WO 2008/107186 A1 | 9/2008 |
| WO | | WO 2008/149210 A2 | 12/2008 |
| WO | | WO 2009/082191 A1 | 7/2009 |
| WO | | WO 2009/082192 A1 | 7/2009 |
| WO | | WO 2009/087559 A1 | 7/2009 |
| WO | | WO 2009/098586 A2 | 8/2009 |
| WO | | WO 2009/148297 A1 | 12/2009 |
| WO | | WO 2011/021935 A2 | 2/2011 |

OTHER PUBLICATIONS

Written Opinion (PCT/ISA/237) issued on Sep. 5, 2011, by the European Patent Office as the International Searching Authority for International Application No. PCT/EP2011/050353.

Search Report issued on Apr. 23, 2010 by the British Patent Office for Application No. 1000556.9.

Search Report issued on Sep. 8, 2010 by the British Patent Office for Application No. 1000556.9.

* cited by examiner

UNDERSEA PIPE-LAYING

TECHNICAL FIELD

This invention relates to a vessel for laying a pipeline at sea and to a method of laying a pipeline. The invention is concerned particularly, but not exclusively, with ramp arrangements on a pipelaying path along which the pipeline is guided.

BACKGROUND OF THE INVENTION

When laying a pipeline at sea one of two methods is commonly used: either the "S" laying method or the "J" laying method. The two methods are named in accordance with the general shape adopted by the pipeline during laying. In "S" laying, the pipeline leaves the vessel at little or no inclination to the horizontal, adopts a steeper inclination in the water and then returns to a generally horizontal disposition on the seabed. In "J" laying, the pipeline leaves the vessel at a steep or vertical inclination and the inclination steadily reduces until the pipeline is in a generally horizontal disposition on the seabed. As interest in laying pipeline in deep water has increased, so "J" laying has become more attractive because the pipeline naturally adopts a vertical or near-vertical orientation far from the seabed. "J" laying is not, however, preferred in shallower water where the natural path of the pipeline is only ever inclined at a shallow angle as it passes to the seabed and "S" laying is therefore advantageous.

"S" laying can be employed in deep water provided the pipeline being laid can be supported from the vessel until it has reached a relatively steep inclination to the horizontal. That, however, requires a considerable length of support, because the radius of bending to which the pipeline can be subjected is limited, especially in the case of large diameter pipelines.

One approach to providing an "S" laying vessel includes providing a semisubmersible vessel with twin keels. For example, U.S. Pat. No. 4,257,718 shows such an arrangement. Another approach to providing an "S" laying vessel involves providing a monohull vessel as shown, for example, in U.S. Pat. No. 5,823,712. An advantage of a twin keel semisubmersible vessel is that it can provide a relatively roll-free environment for the pipe laying and also considerable amounts of space to either side of a central pipe laying path on the vessel (also known to those skilled in the art as "the firing line"). The extra breadth of such a vessel and its relatively large draught are, however, disadvantages compared to a monohull vessel.

When laying small diameter pipes it is sometimes preferred to provide a long length of prefabricated pipeline on a reel and to lay the pipeline by unwinding the reel, but especially for large diameter pipelines it is usual to form the pipeline from discrete lengths of pipe each typically about 12 m long. In this case it is desirable to weld individual lengths of pipe into prefabricated pipe lengths (also referred to herein as "jointed pipe sections") consisting of, say, two, three or four individual lengths of pipe and then to weld the prefabricated pipe lengths to the end of the pipeline as it is being laid. Such a procedure enables the speed of laying to be increased over that which would apply if each individual pipe length were welded in turn to the end of the pipeline as it is laid. Thus the vessel is required to accommodate welding stations and other facilities for preparing and welding together prefabricated pipe lengths. Such workstations are desirably placed at intervals corresponding to one prefabricated pipe length; it is then possible to feed out the pipeline one prefabricated length at a time and each workstation can then be positioned at a respective joint between pipe lengths. The more stations that can be provided along the pipelaying path, the less work has to be done at each station and therefore the faster can be the overall rate of pipelaying.

In WO 2008/107186 a monohull vessel is described which is able to "S" lay pipelines in a particularly advantageous and flexible manner. In that vessel a pivotally mounted internal ramp is provided at the end of the pipelaying path on the vessel and guides the pipeline into the water. Optionally, an external ramp or stinger is connected to the downstream end of the internal ramp to guide the pipeline to a steeper inclination as it passes downwardly away from the vessel and towards the seabed.

It is an object of the invention to provide a vessel for laying a pipeline and a method of laying a pipeline which offers further advantages over the vessels and methods described above.

In a more particular aspect the invention seeks to provide certain improvements to and developments of the vessel that is the subject of WO 2008/107186, the disclosure of which is incorporated herein by reference, but it should be understood that the invention is also applicable to vessels of other designs.

SUMMARY OF THE INVENTION

According to a first aspect of the invention there is provided a method of laying a pipeline from a vessel, in which the pipeline is guided along a pipelaying path along which a plurality of workstations are disposed, the vessel having a first mode of operation in which the pipelaying path along the vessel has a relatively small amount of curvature and leaves the vessel at a relatively shallow angle and in which the plurality of workstations include a downstream workstation which in the first mode of operation is disposed in the region where the pipeline leaves the vessel, and the vessel having a second mode of operation in which the pipelaying path along the vessel has a relatively large amount of curvature and leaves the vessel at a relatively steep angle without passing through the region where the downstream workstation is disposed.

Where reference is made to a "relatively small amount" of curvature, it should be understood that this is simply a reference to an amount of curvature that is small compared to the "relatively large amount of curvature" subsequently referred to. Similarly, where reference is made to a "relatively shallow angle", it should be understood that this is simply a reference to an angle that is of small inclination compared to the "relatively steep angle" subsequently referred to. It should also be understood that in each mode the vessel may be able to operate across a range of curvatures and angles of inclination and that the ranges of the first mode of operation may overlap with the ranges of the second mode of operation.

The pipelaying path may include, towards the first end of the vessel, a downstream portion that is downwardly inclined. Preferably, the upstream portion of the pipelaying path is substantially horizontal. Preferably it is also straight. Such features facilitate welding of sections of the pipeline and other working on the pipeline.

An advantage of the vessel according to the present invention is that it may be used for laying pipeline in both deep and shallow water. When laying pipeline in shallow water the amount of curvature introduced into the pipeline before it leaves the vessel may be deliberately less than the maximum allowed by the vessel design, but when laying pipeline in deep water it will usually be preferred to introduce as much curvature as possible. In a configuration for introducing as much curvature as possible, it is preferred that the pipelaying path enters the water at an angle inclined to the horizontal of more than 20 degrees. The maximum inclination that will be obtainable will depend upon the curvature that the pipeline can tolerate and will generally be greater for a small diameter pipeline than for a large diameter pipeline.

The pipelaying path preferably includes a curved portion extending from the straight, substantially horizontal, upstream portion of the pipelaying path to the downstream portion of the pipelaying path. The invention may be applied to laying of a pipeline of any of a wide variety of diameters.

In conventional vessels for "S" laying, curvature is first introduced into the pipeline close to the stern of the vessel with much of the bending of the pipeline taking place aft of the vessel. Preferred embodiments of the present invention enable that initial bending to take place much earlier and close to the centre of the vessel.

There is also provided, according to a second aspect of the invention, a vessel for laying a pipeline, the vessel including a plurality of workstations disposed along a pipelaying path, a ramp which is disposed along the pipelaying path and whose inclination is adjustable, wherein the ramp is adjustable between a first upper position in which a workstation is positionable on a given part of the pipelaying path alongside the ramp and a second lower position in which the given part of the pipelaying path is submerged.

The ramp is preferably an internal ramp.

The ramp may include guide elements for guiding the pipeline in use as it passes over the ramp. Such guide elements may for example comprise rollers or tracked assemblies. The guide elements preferably assist guiding of the pipeline as it arrives at the upstream end of the ramp, and as it leaves the downstream end of the ramp.

Where reference is made herein to an "internal ramp" it should be understood that this does not imply that the whole of the ramp is located within the envelope of the vessel, but only that the upstream end of the ramp is located within the envelope of the vessel. The downstream end of the ramp may always be positioned outside that envelope or may be so positioned in some, but not all, positions of the ramp. Preferably the downstream end of an internal ramp is positioned inboard of the first end of the vessel in all working positions of the ramp. Also it should be understood that where reference is made in this specification to a position above the bottom of the hull or vessel or inboard of the end of the hull or vessel, it is the envelope of the hull or vessel that is being referred to; in an embodiment of the invention described below the hull advantageously is provided with an elongate recess at a stern end, but that recess does not alter the envelope of the hull and a portion of a ramp within the recess is still within the envelope of the hull. In a case where the invention is applied to a semisubmersible vessel or some other multihulled vessel, the envelope of the vessel is of course an envelope around all the hulls.

Internal or external ramps are commonly pivotally connected to a vessel hull and/or to another ramp. Such pivotal connection, however, limits the kind of adjustment of the ramp that is possible. In the present invention the ramp is preferably mounted in such a way that its inclination can be changed and it can also be moved translationally with at least a component of the movement in a vertical direction. The vessel preferably includes a first adjusting mechanism for effecting movement of the ramp with at least a component of the movement in a vertical direction and a second adjusting mechanism for effecting a change of the inclination of the ramp. The ramp may be mounted on the vessel hull via struts whose length is adjustable and/or whose connection to the ramp is adjustable along the strut. The mounting on the hull may be mounting on a deck of the vessel which in turn is connected directly or indirectly to the vessel hull. In that case, and in other cases, it may be that each of the first and second adjusting mechanisms effect both a vertical movement of the ramp and a change in inclination of the ramp. For example a pair of struts may be provided at the upstream end of the ramp and another pair of struts may be provided at the downstream end of the ramp. One or more of the struts may include a hydraulic piston and cylinder arrangement for adjusting the length of the struts or the position of the connection of the ramp to the struts.

It is desirable to have as many workstations as possible along the pipelaying path. In preferred embodiments of the present invention, the range of movement of the ramp is very considerable allowing the pipelaying path to be of very different shapes and allowing a wide range of diameters of pipeline to be laid over a wide range of depths. That can result in the ramp having an upper position in which it is useful to have a workstation in that region, but a lower position in which most of the ramp is submerged and it is no longer possible to have a workstation in that region. In such a case, it may nevertheless be useful to provide the workstation, preferably not mounted on the ramp. The workstation may if desired be retractable away from the pipelaying path so that when it is not in use it does not in any way impede pipelaying.

With this preferred feature it is possible when introducing only a relatively small amount of curvature into the pipeline (with a correspondingly large radius of curvature which may be more than 300 m is preferably more than 400 m and in an embodiment described below is about 460 m), to make full use of the most downstream workstation. Such an arrangement is suitable for laying in relatively shallow water. On the other hand when introducing a relatively large amount of curvature into the pipeline (with a correspondingly small radius of curvature which may be less than 200 m is preferably less than 150 m and in an embodiment described below is about 110 m), that most downstream workstation may not be used with a consequent reduction in the speed at which pipeline can be laid. Such an arrangement is suitable for laying in relatively deep water. In an embodiment of the invention described below the most downstream workstation is a seventh workstation so the vessel operates in one mode with six workstations and in another mode with seven workstations.

According to the second aspect of the invention there is also provided a method of laying a pipeline from a vessel, in which the pipeline is guided along a path along which a plurality of workstations are disposed, the pipeline being guided over a ramp which is disposed along the pipelaying path and whose inclination is adjustable, wherein the ramp is adjustable between a first upper position in which a workstation is positionable on a given part of the pipelaying path alongside the ramp and a second lower position in which the given part of the pipelaying path is submerged.

There is also provided, according to a third aspect of the invention, a vessel for laying a pipeline, the vessel including a plurality of guide elements for guiding the pipeline along a pipelaying path that includes an upstream portion away from a first end of the vessel and, towards the first end of the vessel, a downstream portion and a ramp that is disposed along the pipelaying path and having an inclination that is adjustable, wherein a clamp for clamping the pipeline is mounted on the adjustable ramp.

The clamp may be a fixed clamp. The fixed clamp may include a collar clamp or a friction clamp, or both a friction clamp and a collar clamp. In an embodiment of the invention described below the fixed clamp is mounted such that it is able to move a certain distance along the pipelaying path to accommodate, for example, pitching of the vessel resulting for example from waves.

The clamp is preferably mounted on the adjustable ramp, preferably at the downstream end of the ramp.

The range of movement in a vertical plane and perpendicular to the pipelaying path of the portion of the ramp on which the clamp is mounted may be more than 2 m and in an embodiment of the invention is more than 4 m. The guide elements may comprise rollers or tracked assemblies.

Preferably the ramp is mounted on the body of the vessel such that in use it can transmit tension in the pipeline through its mounting to the deck of the vessel. In the case where struts are provided, the ramp may be mounted on a pair of struts that allow movement of the ramp in a direction along the struts but resist movement of the ramp in a direction transverse to the struts and along the pipelaying path. Such a pair of struts can transfer longitudinal forces applied by the pipeline to the ramp to the hull (or deck) of the vessel. The clamp may be required to transmit very substantial longitudinal forces from the pipeline to the ramp and those forces must then be transmitted from the ramp to the hull of the vessel.

There is also provided, according to a fourth aspect of the invention, a vessel for laying a pipeline, the vessel including a plurality of workstations disposed along a pipelaying path, a ramp which is disposed along the pipelaying path and whose inclination is adjustable, wherein a working platform of a workstation is adjustably mounted on the ramp and is movable relative to the ramp when, in use, the inclination of the ramp is altered to reduce the change in inclination of the working platform.

In an especially preferred embodiment of the invention, a working platform of a workstation is mounted on the ramp for movement with the ramp and is also adjustable in position relative to the ramp. By mounting the workstation on the ramp, its movement naturally follows the movement of the ramp. By making its position adjustable relative to the ramp, it becomes possible to ensure that the position of the workstation relative to the pipelaying path is as good as it can be. Preferably the inclination of the workstation relative to the ramp is adjustable. In such a case, when the inclination of the ramp is increased, the inclination of the workstation relative to the ramp can be changed in the opposite direction to reduce or eliminate any change in the absolute inclination of the workstation. In that way the working platform of the workstation may be maintained in a substantially horizontal orientation. Preferably the inclination of the working platform is never more than 10 degrees to the horizontal and more preferably never more than 6 degrees to the horizontal. On the other hand the inclination of the ramp to the horizontal may be of the order of 20 degrees. Preferably the working platform is adjustable translationally relative to the ramp, preferably at least in an upwards and downwards direction. That enables the working platform to be positioned in use at the best position relative to the pipeline, regardless of the positioning of the ramp and regardless of the diameter of the pipeline.

Preferably a control system is provided for controlling the adjustment of the working platform in dependence upon the adjustment of the ramp. The control system may be partly or fully automatic. It may be arranged to reduce the change in inclination of the working platform as the inclination of the ramp is altered or to maintain the inclination of the working platform constant, possibly at zero inclination, as the inclination of the ramp is changed. The control system may be arranged to keep the working platform in the same position relative to the hull of the vessel; another possibility is for the control system to be arranged to keep the working platform in the same position relative to the central axis of the pipelaying path along the ramp.

According to the fourth aspect of the invention, there is also provided a method of laying a pipeline from a vessel, in which the pipeline is guided along a path along which a plurality of workstations are disposed, the pipeline being guided over a ramp which is disposed along the pipelaying path and whose inclination is adjustable, wherein a working platform of a workstation is adjustably mounted on the ramp and is moved relative to the ramp when the inclination of the ramp is altered to reduce the change in inclination of the working platform.

Preferably the adjustment of the working platform is carried out in dependence upon the adjustment of the first ramp. The adjustment may be partly or fully automatic. It may be arranged to reduce the change in inclination of the working platform as the inclination of the first ramp is altered or to maintain the inclination of the working platform constant, possibly at zero inclination, as the inclination of the first ramp is changed. The adjustment may be arranged to keep the working platform in the same position relative to the hull of the vessel; another possibility is for the control system to be arranged to keep the working platform in the same position relative to the central axis of the pipelaying path along the first ramp.

It will be appreciated that the various aspects of the invention as described herein are closely related and that therefore essential or preferred features of one aspect of the invention may be incorporated into other aspects of the invention as described herein. Also, any aspect of the method of the invention may use, or be performed on, a vessel according to the same, or any other, aspect of the invention. Similarly, the vessel according to any aspect of the invention may be so configured as to be suitable for use in a method according to the same, or any other, aspect of the invention. Features of the vessel of the invention may be incorporated into the method of the invention and vice versa. The invention is described and exemplified with reference to "S" laying, that being the preferred method of laying in all aspects of the invention.

BRIEF DESCRIPTION OF THE DRAWINGS

By way of example embodiments of the invention will now be described with reference to the accompanying schematic drawings, of which.

DETAILED DESCRIPTION OF EMBODIMENTS

Figure 1:
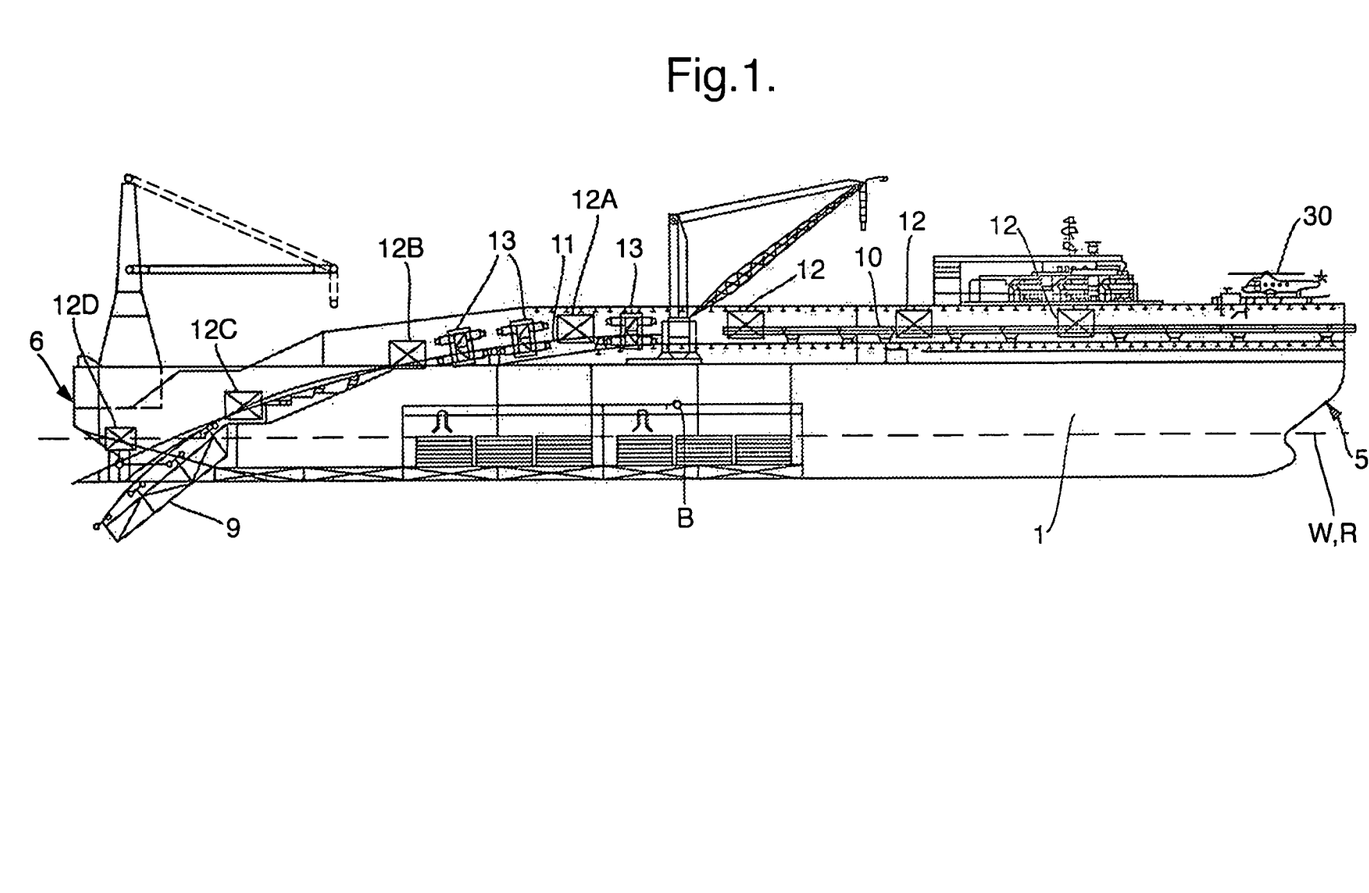
FIG. 1 is a partly sectional side view of a monohull vessel for laying a pipeline, the vessel including a single adjustable internal ramp assembly and not embodying the invention

FIG. 1 is the same drawing as shown in WO 2008/107186 and reference can be had to that publication for further details of that vessel. Since, however, embodiments of the invention described below comprise modifications of the vessel shown in the drawings of WO 2008/107186 it is convenient to describe briefly the vessel shown in that publication.

The vessel generally comprises a vessel hull 1, within which are defined a plurality of prefabricated decks for the prefabrication of jointed pipe sections from individual lengths of pipe and on which cranes and other facilities are provided. The bow 5 of the hull 1 is shown on the right hand side and the stern 6 of the hull 1 is shown on the left hand side, as viewed in FIG. 1.

The vessel hull 1 is of unconventional design at its stern end, having starboard and port end portions between which an elongate recess is defined. The recess is open at the stern end of the hull 1 and is also open downwardly (into the sea), but it may be closed over the top by a deck. In FIG. 1, an internal ramp 9 is shown pivotally connected to the hull of the vessel and is disposed in the protected stern area defined by the elongate recess at the stern end of the hull.

The barycentre B (centre of gravity) of the vessel is marked in FIG. 1, which also shows the water line W (the level of the sea when the vessel is at its working draught). The rolling axis R (the axis about which the vessel naturally rolls) is coincident with the waterline W.

Along the length of the middle of the vessel a pipe laying path (firing line) is defined. Ramps are provided along the path: at the upstream end (the right hand end as seen in FIG. 1) of the path, there is a horizontal, straight, fixed ramp 10; following that there is a curved, fixed, ramp 11 which extends between the fixed ramp 10 and the internal ramp 9. Thus the pipe laying path has an upstream horizontal section along the ramp 10 and leading to a curved section 11 that is of constant, fixed, curvature and which in turn leads to the downstream section along the internal ramp 9. The inclination of the ramp 9 relative to the vessel hull 1 can be adjusted and the ramp 9 is also provided with rollers which can be moved in a plane transverse to the pipelaying path to alter the curvature of the ramp 9. Thus at one extreme (suitable for laying in relatively shallow water), the portion of the pipe laying path along the internal ramp 9 may have only a small amount of curvature and the downward inclination of the path may be only slightly greater at the downstream end of the internal ramp 9 than at the downstream end of the curved ramp 11; at the other extreme (suitable for laying in relatively deep water) the pipe laying path along the internal ramp 9 may have a greater amount of curvature so that the downward inclination of the pipe laying path at the downstream end of the internal ramp 9 is substantially greater than the downward inclination of the path at the downstream end of the curved ramp 11. In FIG. 1, the ramp 9 is shown pivoted to a position suitable for substantially increasing the downward inclination of the pipe laying path.

Working stations in the form of welding stations 12 are provided along the fixed ramp 10 for welding new jointed sections of pipe to the end of the pipeline being laid. The active length of the horizontal, straight, portion of the pipelaying path extends from a distance corresponding to one jointed section of pipe upstream of the most upstream welding station 12 (the one furthest to the right in FIG. 1) to the upstream end of the curved ramp 11. The extended length of the horizontal, straight, portion of the pipelaying path extends further to the right (as seen in FIG. 1) to a location below the helicopter 30 shown in FIG. 1. Tensioners 13, of which three are shown in FIG. 1, are provided along the curved ramp 11 for tensioning the pipeline downstream of the tensioners. The precise form of the welding stations and tensioners is not relevant to the present invention and thus may take any known form. It may be noted that in FIG. 1 the tensioners 13 are shown as crawler track tensioners, but it should be understood that they may take other forms.

Downstream of the tensioners 13, the tension in the pipeline will cause it to follow the curvature of the ramps 11 and 9 so that only rollers below the pipeline are required. Upstream of one or more of the tensioners 13, however, where the pipelaying path first becomes curved that tension is hardly present and it may therefore be desirable to provide pressure rollers (not shown) above the pipeline to apply downward pressure onto the pipeline and cause it to follow the path defined by the curved ramp 11. Such pressure rollers can also assist in causing the pipeline to follow the path defined by the curved ramp 11 during abandonment/recovery operations.

In use of the vessel to lay a pipeline, the vessel is driven in a forwards direction by its propulsion system and, as is conventional for "S" laying of a pipeline, a considerable forward thrust is maintained, even when the vessel is not moving forwards, to balance the rearward force exerted on the vessel by the tension in the pipeline. The vessel is preferably equipped with a dynamic positioning system to maintain its desired position at all times. The pipeline is passed rearwardly over the vessel along the pipe laying path with the tensioners 13 controlling the passage of the pipeline. As the end of the pipeline moves along the horizontal fixed ramp 10, new jointed sections of pipe are welded to the end of the pipeline. As the pipeline reaches the curved ramp 11, the pressure rollers above the pipeline cause the pipeline to curve downwardly following the path of the curved ramp 11 and passing through the tensioners 13. The tension in the pipeline increases as it passes through the tensioners 13 reaching full tension after the last tensioner. The pipeline moves away from the vessel hull 1 as it passes from the curved ramp 11 onto the internal ramp 9 and, soon after passing onto the internal ramp 9 enters the water. As can be seen from FIG. 1, the point of entry of the pipeline into the water is within the protected stern area defined by the elongate recess in that area. The pipeline then passes to the end of the internal ramp 9, leaves the internal ramp 9 and passes down to the seabed. Usually, the forward thrust maintained by the vessel will be such that the pipeline is substantially straight and tangential to the end of the curved path defined by the ramp 9 in the region immediately downstream of the internal ramp 9 before then reducing in inclination as it approaches the seabed. In that way any sharp curvature at the end of the internal ramp 9 is avoided.

If the vessel is required to operate in deep water, then it may be desirable to add a further ramp and/or stinger downstream of the internal ramp 9 in order to provide further controlled curvature to the pipeline. In this specification, there is no particular distinction made between the use of the terms "ramp" and "stinger" and thus no particular construction of any further ramp is implied by choosing to call it a "ramp" rather than a "stinger".

Figure 2:
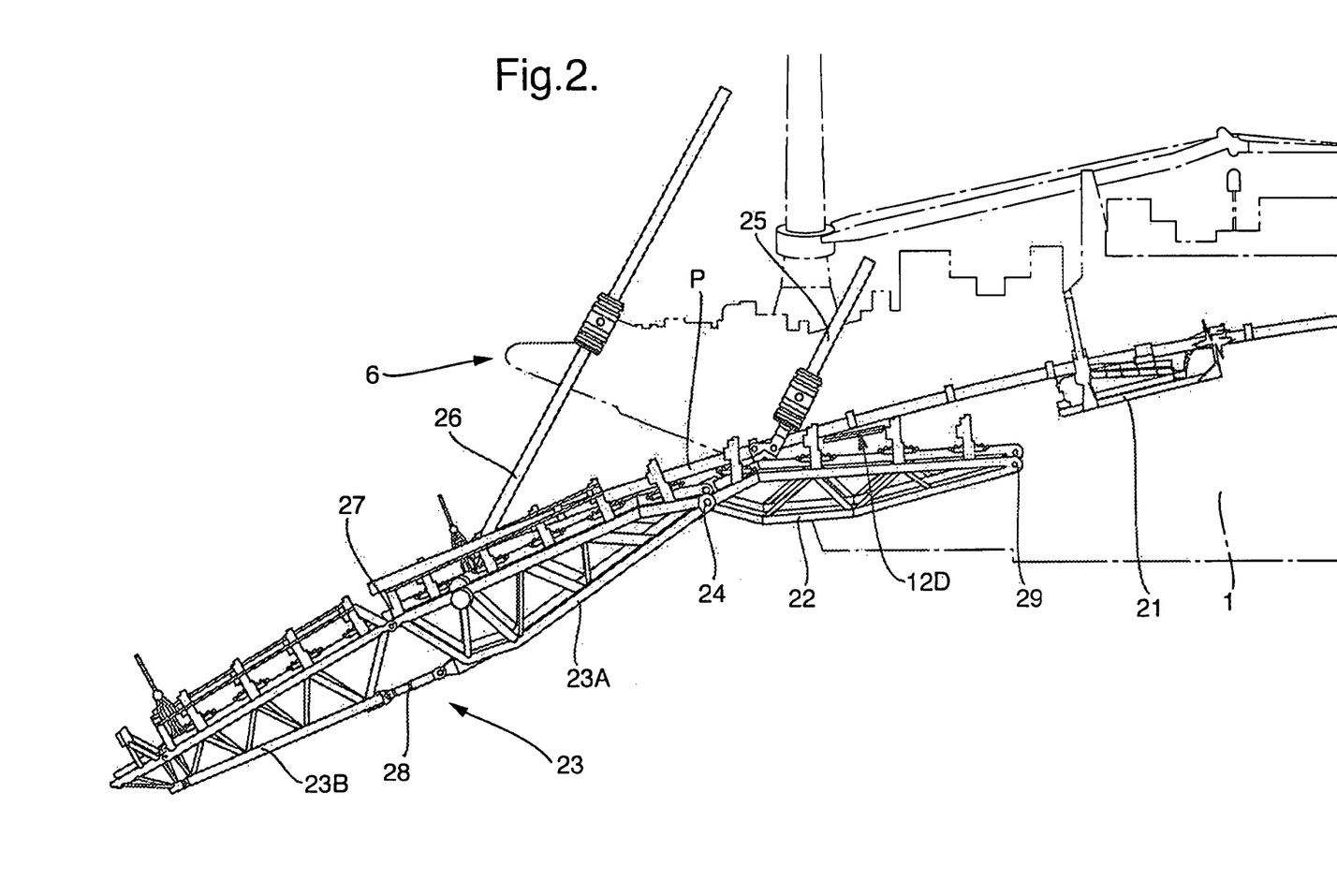
FIG. 2 is a partly sectional side view of the vessel of FIG. 1 modified according to an embodiment of the invention by the provision of a further adjustable internal ramp assembly upstream of another internal ramp assembly, the modified vessel also having an external ramp (stinger)

FIG. 2 shows the stern end of the vessel already described with reference to FIG. 1 but modified in accordance with the invention. The principal modification is the provision of another adjustable internal ramp upstream of the ramp 9 of the vessel of FIG. 1, resulting in a vessel that has a first internal adjustable ramp 21 and a second internal adjustable ramp 22.

In FIG. 2, a stinger 23 is shown connected to the downstream end of the second ramp 22. The upstream end of the stinger 23 is pivotally connected at 24 to the downstream end of the second ramp 22 which in turn is pivotally connected at 29 to the hull of the vessel. A pair of hydraulic rams 25 are pivotally connected to the ramp 22 towards its downstream end to enable the second ramp 22 to be pivoted relative to the vessel hull 1. Similarly, a pair of hydraulic rams 26 are pivotally connected to the stinger 23 partway along its length to allow the stinger to be pivoted about its pivoted connection to the second ramp 22.

The stinger 23 shown in FIG. 2 is made up of two portions 23A and 23B that are pivotally connected together at their tops at a connection 27 and connected at their bottoms by a pair of fixed links 28. In that mode the stinger operates as a single external ramp. It is, however, possible to replace the links 28 by a pair of hydraulic rams and, by actuating those rams, pivot the downstream portion 23B of the stinger relative to the upstream portion 23A.

The ramps 21 and 22 and the stinger 23 are provided with guide elements in the form of sets of rollers and/or tracked assemblies which guide a pipeline being laid from the vessel. The guide elements are adjustably mounted on the ramps 21, 22 and optionally also on the stinger 23, with appropriate hydraulic actuators (not shown) so as to define the desired curvature to the path of the pipeline as it passes over the guide elements.

Figure 3A:
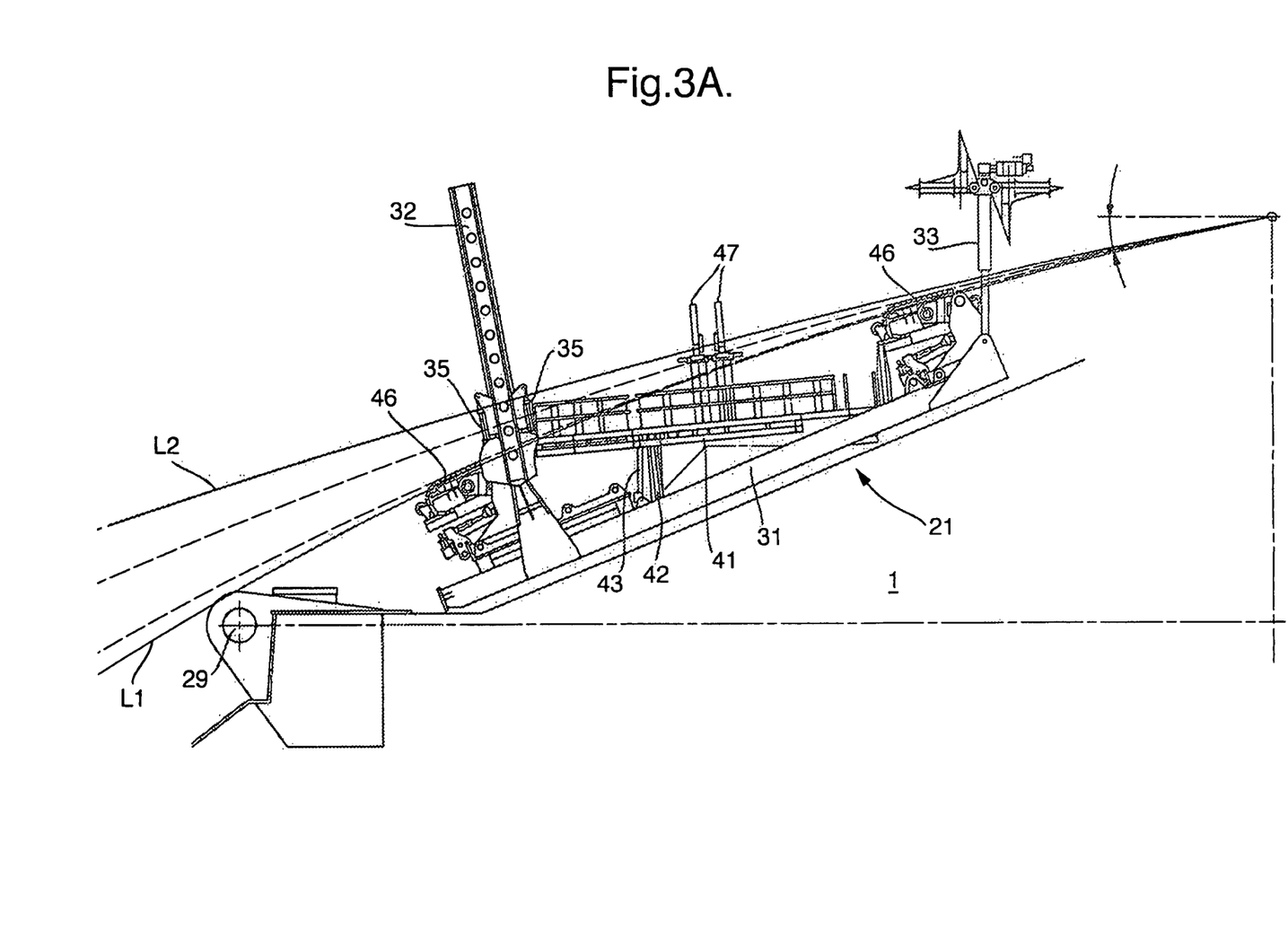
FIG. 3A is a side view of the further adjustable internal ramp assembly in a first position suitable for operation with six workstations.
Figure 3B:
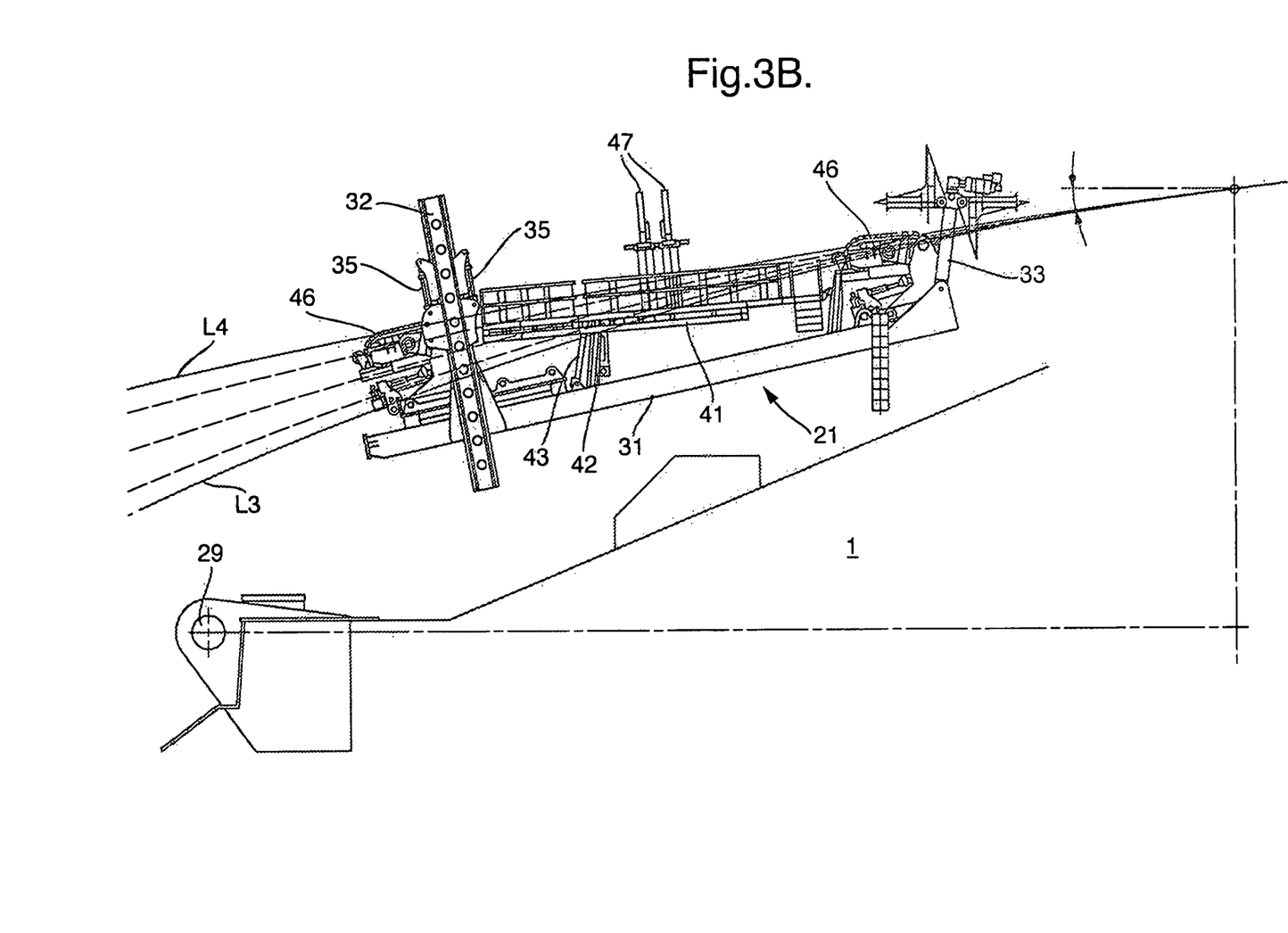
FIG. 3B is a side view of the further adjustable internal ramp assembly in a second position suitable for operation with seven workstations.
Figure 4A:
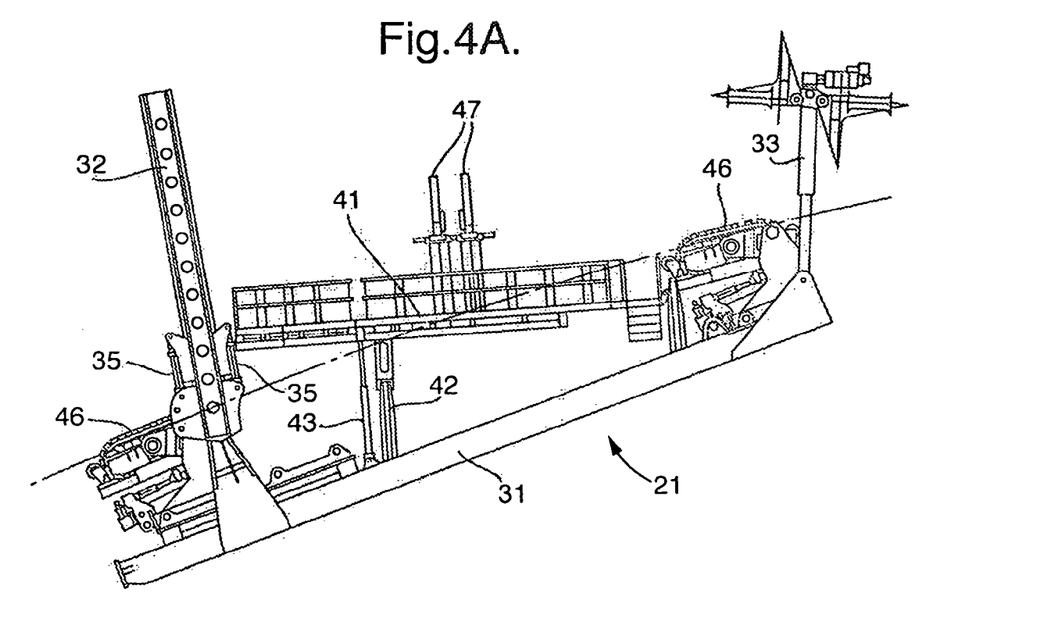
FIG. 4A is a side view of the further adjustable internal ramp assembly with a working platform in a first position, elevated relative to the ramp assembly.
Figure 4B:
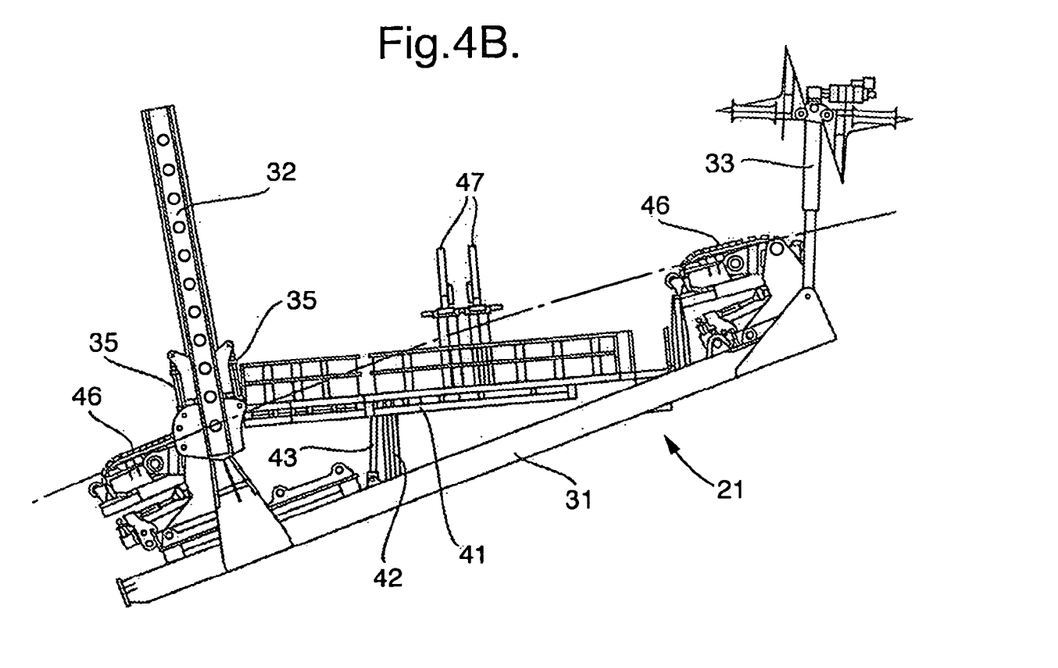
FIG. 4B is a side view of the further adjustable internal ramp assembly with a working platform in a second lower position relative to the ramp assembly.
Figure 5:
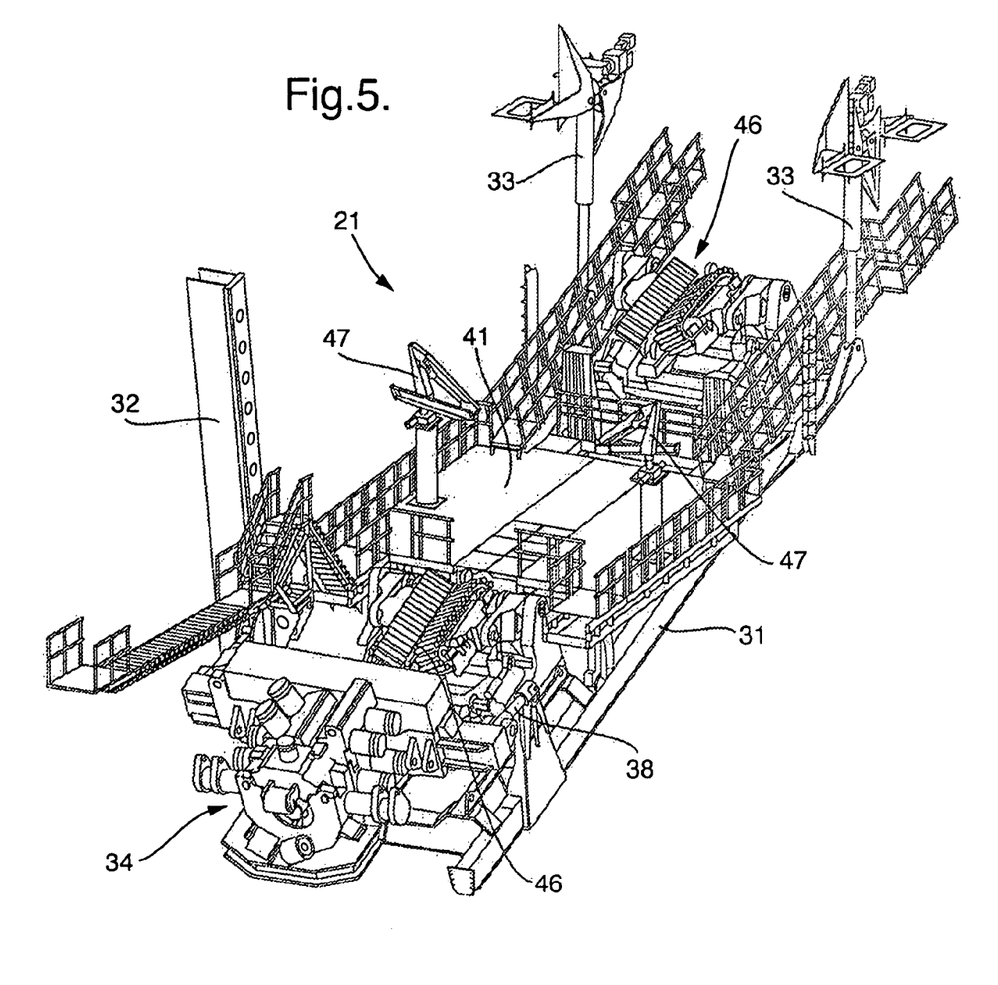
FIG. 5 is an isometric view of the further adjustable internal ramp assembly with some additional parts shown and some parts omitted.

Referring now to FIG. 3A to FIG. 5, some further details of the ramp 21 and the assembly of which it forms a part can be seen. The ramp 21 has a main frame 31 which is suspended at its downstream end by a pair of robust extensible struts 32, and at its upstream end by a pair of less robust struts 33(one of the struts 32 being omitted from FIG. 5). The struts 33 comprise screw jacks that are pivotally connected at a lower end to the frame 31 and pivotally connected at the upper end to the vessel hull. The purpose of the struts 33 is to adjust the vertical position of the upstream end of the first ramp 21. They do not resist movement of the ramp 21 along the pipelaying path. The struts 32 on the other hand allow movement of the frame 31 along them but are rigidly connected to the vessel at their top ends. The position of the frame 31 along these struts is adjustable by operation of a pair of hydraulic rams 35 and is lockable in a given selected position. Such jacking systems are known per se. The pair of struts 32 not only withstand the vertical load imposed by the weight of the ramp 21 and the transverse load imposed by the tension in the pipeline as it passes over the ramp on a curved path, but are also able if necessary to accommodate the loads imposed by a fixed clamp 34 which may be mounted on the ramp 21 and is shown in FIG. 5 only. In normal operation the fixed clamp 34 is not operated and no longitudinal load is transmitted from the clamp 34 to the ramp 21, but in some circumstances it will be desirable to hold the tension in the pipeline by the fixed clamp 34 (for example to allow the pipeline upstream of the clamp 34 to be cut). In this case the clamp 34 is clamped to the pipeline and the longitudinal load then exerted on the clamp 34 (which load is likely to be more than 100 tonnes and may be more than 500 tonnes) transmitted to the frame 31 of the ramp 21 via a pair of hydraulic rams 38, one of which is referenced in FIG. 5. The load from the rams 38 are transmitted to respective ones of the struts 32 which then transmit the longitudinal load through the struts to the frame 31. As will be understood, the fixed clamp moves with the downstream end of the ramp 21 and, as a result may move in a vertical plane perpendicular to the pipelaying path a distance of 4 m or more.

The structure of the internal clamp may be of a kind known per se. One suitable form of clamp is described in our British Patent Application No 0909425.1, the description of which is incorporated herein by reference.

The ramp assembly incorporating the ramp 21 is also provided with a working platform 41 which is adjustably mounted on the ramp. A pair of hydraulically operated linkages 42 and a pair of hydraulic rams 43 downstream of the linkages 42 are provided to effect the adjustment. By adjusting the linkages 42 and the rams 43, it will be seen that the height of the platform 41 and also its inclination relative to the ramp 21 can be adjusted as desired. In FIGS. 4A and 4B the platform is shown in upper and lower horizontal positions respectively. As will be understood the terms "upper" and "lower" in the previous sentence refer to the position of the platform relative to the ramp 21. In the drawings the platform 41 is shown fitted with a pair of load handling arms 47, but it will be understood that a wide variety of equipment can be provided on the platform.

The vessel is provided with a control system which is able to control the operation of the linkages 42 and the rams 43, automatically or semi-automatically to keep the working platform 41 in its desired position when the ramp 21 is moved. The control system is integrated with the system for controlling movement of the ramp 21 and in a preferred embodiment of the invention the same control system controls movement of the ramp 22 and the stinger 23 as well as any sets of guide elements on the ramps and stinger that are adjustable to control the curvature of the pipeline. In this respect it may be noted that in FIG. 5, tracked assemblies 46 are provided at opposite ends of the ramp 21 for guiding the pipeline.

Referring again to FIG. 1, reference has already been made to the three welding stations referenced 12. Also shown in FIG. 1 are three further working stations referenced 12A, 12B and 12C. It can be seen that the pivotal connection 29 is in the region of the working station 12C, which is the sixth working station. In the embodiment of the invention described, there is yet another welding station 12D, downstream of the station 12C. As shown in FIG. 1 the working station is displaced vertically above the ramp 9 and is apparently useless, but FIG. 1 shows the ramp 9 at a relatively steep inclination. At a more shallow inclination of the ramp 9, the working station 12D is positioned in the region of the ramp 9 and can be used to carry out further work on the pipeline. The provision of this seventh working station, when it can be used, is useful in enabling the work on the pipeline to be distributed between one more station and therefore the time for which the pipeline has to be stationary at the working stations can be reduced. In FIG. 2, the position of the seventh working station 12D is again marked.

In the description above, dimensions of the vessel and of the pipelaying path are not mentioned. The particular arrangement chosen for any particular vessel will depend on many circumstances, including the envisaged use of the vessel. For a vessel embodying the invention and especially well suited to laying triple lengths of pipe, each of 36 m length (12 m per individual pipe length), a particularly advantageous set of ranges of parameters is as follows:

Length of vessel hull 1: 260 m to 330 m
Breadth of vessel hull 1: 35 m to 45 m
Radius of curvature of curved ramp 11: 300 m to 310 m As will now be understood the vessel has two modes of operation. In one mode (referred to elsewhere in the specification as the second mode), illustrated in FIG. 3A, but not in FIG. 3B, a relatively large amount of curvature is introduced into the pipeline, as is required when laying the pipeline in relatively deep water. In this mode, the final (seventh) work station 12D is not used. In another mode, (referred to elsewhere in the specification as the first mode), illustrated in FIG. 3B, but not FIG. 3A, a relatively small amount of curvature is introduced into the pipeline, as is required when laying the pipeline in relatively shallow water. In this mode the final (seventh) work station is used.

The different positions of the ramp 21 in the two modes can readily be appreciated by comparing FIGS. 3A and 3B. It can be seen that the ramp 21 is higher, relative to the vessel hull 1, in FIG. 3B than in FIG. 3A and that the inclination of the ramp 21 is less in FIG. 3B than in FIG. 3A. In each case, however, the working platform 41 is adjusted to an approximately horizontal position.

In FIG. 3A, curved solid lines L1 and L2 show approximate extremes of the path of the bottom of the pipeline P for laying in the first mode with six work stations. In the case of line L1 the radius of curvature of the pipeline as it passes over the ramp 21 is 110 m (the smallest radius of curvature corresponding to the greatest amount of curvature) and in the case of line L2 the radius of curvature of the pipeline as it passes over the ramp 21 is 300 m. Similarly in FIG. 3B, curved solid lines L3 and L4 show approximate extremes of the path of the bottom of the pipeline P for laying in the mode with seven work stations. In the case of line L3 the radius of curvature of the pipeline as it passes over the ramp 21 is 130 m and in the case of line L4 the radius of curvature is 460 m (the greatest radius of curvature corresponding to the least amount of curvature).

A vessel of the kind described above with reference to the drawings is able to conduct effective pipe-laying operations with a wide variety of sizes of pipe and in both shallow and deep water, with especially deep laying being possible with smaller diameter pipe. Furthermore the vessel is able to operate in very shallow water. Also, the location of the internal ramps within the protected stern area makes the vessel suitable for operation in the subarctic and arctic zones.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of S-laying laying a pipeline from a vessel, in which the pipeline is guided along a pipelaying path along which a plurality of workstations are disposed, the vessel having a first mode of operation in which the pipelaying path along the vessel has a relatively small amount of curvature and leaves the vessel at a relatively shallow angle and in which the plurality of workstations include a downstream workstation which in the first mode of operation is disposed in the region where the pipeline leaves the vessel, and the vessel having a second mode of operation in which the pipelaying path along the vessel has a relatively large amount of curvature and leaves the vessel at a relatively steep angle without passing through the region where the downstream workstation is disposed.

2. A method according to claim 1, in which the radius of curvature of the pipeline in the region of the downstream workstation is more than 300 m in the first mode of operation.

3. A method according to claim 1, in which the radius of curvature of the pipeline in the region of the downstream workstation is less than 200 m in the second mode of operation.

4. A method according to claim 1, in which the downstream workstation is retracted away from the pipelaying path in the second mode of operation.

5. A vessel for S-laying laying a pipeline, the vessel including a plurality of workstations disposed along a pipelaying path, a ramp which is disposed along the pipelaying path and whose inclination is adjustable, wherein the ramp is adjustable between a first upper position in which a workstation is positionable on a given part of the pipelaying path alongside the ramp and a second lower position in which the given part of the pipelaying path is submerged.

6. A vessel according to claim 5, the vessel further including a plurality of guide elements for guiding the pipeline along the pipelaying path that includes an upstream portion away from a first end of the vessel and, towards the first end of the vessel, a downstream portion, wherein a fixed clamp for clamping the pipeline is mounted on the adjustable ramp, and wherein a working platform of one of the workstations is mounted on the ramp for movement with the ramp and is also adjustable in position relative to the ramp.

7. A vessel according to claim 6, in which the clamp is mounted at the downstream end of the adjustable ramp.

8. A vessel according to claim 6, in which the range of movement in a vertical plane and perpendicular to the pipelaying path of the portion of the ramp on which the clamp is mounted is more than 2 m.

9. A vessel according to claim 5, wherein a working platform of one of the workstations is adjustably mounted on the ramp and is movable relative to the ramp when, in use, the inclination of the ramp is altered to reduce the change in inclination of the working platform.

10. A vessel according to claim 9, in which the adjustment of the working platform is partly or fully automatic.

11. A vessel according to claim 9, in which the adjustment of the working platform is carried out in dependence upon the adjustment of the ramp.

12. A method of S-laying laying a pipeline from a vessel, in which the pipeline is guided along a path along which a plurality of workstations are disposed, the pipeline being guided over a ramp which is disposed along the pipelaying path and whose inclination is adjustable, wherein the ramp is adjustable between a first upper position in which a workstation is positionable on a given part of the pipelaying path alongside the ramp and a second lower position in which the given part of the pipelaying path is submerged.

13. A method according to claim 12, wherein an inclination of the ramp is adjustable, wherein a working platform of one of the workstations is adjustably mounted on the ramp and is moved relative to the ramp when the inclination of the ramp is altered to reduce the change in inclination of the working platform.

* * * * *